(12) United States Patent
Seppi

(10) Patent No.: US 11,254,089 B2
(45) Date of Patent: Feb. 22, 2022

(54) LIGHTWEIGHT INNER DASH

(71) Applicant: Autoneum Management AG, Winterthur (CH)

(72) Inventor: Marco Seppi, Altstatten (CH)

(73) Assignee: AUTONEUM MANAGEMENT AG, Winterthur (CH)

( * ) Notice: Subject to any disclaimer, the term of this patent is extended or adjusted under 35 U.S.C. 154(b) by 0 days.

(21) Appl. No.: 16/467,880

(22) PCT Filed: Nov. 28, 2017

(86) PCT No.: PCT/EP2017/080595
§ 371 (c)(1),
(2) Date: Jun. 7, 2019

(87) PCT Pub. No.: WO2018/104100
PCT Pub. Date: Jun. 14, 2018

(65) Prior Publication Data
US 2020/0086603 A1    Mar. 19, 2020

(30) Foreign Application Priority Data

Dec. 8, 2016 (EP) .................................... 16203051

(51) Int. Cl.
| | |
|---|---|
| *B32B 5/02* | (2006.01) |
| *B32B 5/26* | (2006.01) |
| *B32B 27/12* | (2006.01) |
| *B32B 27/32* | (2006.01) |

(52) U.S. Cl.
CPC ............... *B32B 5/022* (2013.01); *B32B 5/26* (2013.01); *B32B 27/12* (2013.01); *B32B 27/32* (2013.01); *B32B 2262/0253* (2013.01); *B32B 2262/0261* (2013.01); *B32B 2262/0276* (2013.01); *B32B 2262/101* (2013.01); *B32B 2307/718* (2013.01); *B32B 2605/08* (2013.01)

(58) Field of Classification Search
CPC  B32B 5/022; B32B 5/26; B32B 27/12; B32B 27/32; B32B 2262/0253; B32B 2262/0261; B32B 2262/0276; B32B 2262/101; B32B 2307/718; B32B 2605/08; B60R 13/08
See application file for complete search history.

(56) References Cited

FOREIGN PATENT DOCUMENTS

| | | |
|---|---|---|
| EP | 3015314 A1 | 5/2016 |
| WO | 2016066640 A1 | 5/2016 |

OTHER PUBLICATIONS

ISR dated Mar. 5, 2018.

*Primary Examiner* — Catherine A. Simone
(74) *Attorney, Agent, or Firm* — FisherBroyles, LLP; Craig W. Mueller

(57) ABSTRACT

Moulded inner dash trim part for a vehicle comprising a porous fibrous layer comprising fibers and thermoplastic binder, and an air permeable foil laminated together wherein the fibers comprise conjugate frizzy fibers made of at least 2 sides with a difference between the two sides inducing an intrinsic permanent frizzy or curved shape in a random 3 dimensional form, and wherein the air permeable foil has an airflow resistance that is between 30-75% of the total airflow resistance of the trim part.

16 Claims, 1 Drawing Sheet

LIGHTWEIGHT INNER DASH

This application is a United States national phase of PCT Application No. PCT/EP2017/080595, filed with the World Intellectual Property Office on Nov. 28, 2017, which claims the benefit of EP16203051.4, filed with the European Patent Office on Dec. 8, 2016, the entireties of which are incorporated by reference herein.

TECHNICAL FIELD

The present invention is directed to an inner dash trim part for a vehicle, in particular cars, and a method of producing such trim part.

BACKGROUND ART

Inner dash trim parts for vehicles, such as cars, are well known in the art. These trim parts are used as insulators and absorbers to reflect and dissipate noise thus reducing the overall interior noise level in the vehicle. Inner dashes are normally made of several layers moulded into a three dimensional shape in order to follow the shape of the vehicles body when installed in the vehicle.

Inner dash insulators with absorbing layer combined with a perforated foil are known in the art; however the performance of the foil is limited.

These trim parts may comprise a textile felt layer, however the use of such felt layers according to the state of the art has limitations. In particular the felt tends to reduce in its thickness during use of the trim part and or especially during the production process where in addition the fibers used, in particular reclaimed fibers, tend to clump together even after the carding or airlay process giving rise to an irregular felt mat as starting material for forming parts.

The noise attenuating of such fibrous layer, also together with a foil, is therefore degraded.

It is therefore the object of the current invention to further optimise fibrous absorbing products of the state of the art as well as improving the effect of the foil, in particular to further optimise the overall acoustic performance of the part.

SUMMARY OF INVENTION

These problems are solved with the inner dash trim part according to claim 1 and the process for producing such inner dash trim part according to claim 14.

The object of the invention is achieved by a moulded inner dash trim part for a vehicle comprising a porous fibrous layer comprising fibers and thermoplastic binder, and an air permeable foil laminated together wherein the fibers comprise conjugate frizzy fibers made of at least two sides with a difference between the two sides inducing an intrinsic permanent frizzy or curved shape in a random 3 dimensional form, and wherein the air permeable foil has an airflow resistance that is between 30-75% of the total airflow resistance of the trim part.

Preferably the inner dash trim part comprises at least one area consisting of the porous fibrous layer and the air permeable foil.

Surprisingly the fibrous layer with frizzy fibers in combination with an air permeable foil that has an airflow resistance between 30-75% of the total airflow resistance of the trim part enhances the noise attenuation. Due to the impedance difference between the porous fibrous layer and the foil the noise attenuation and especially the noise absorption is improved. In order to increase the noise absorption the air permeable foil should not have a too high airflow resistance (AFR) reflecting the noise, however the foil should also not have too low AFR since the foil will then have no, or very little effect on the absorption.

Preferably the total airflow resistance of the trim part is between 500 and 6000 Ns·m$^{-3}$, preferably between 500 and 4000 Ns·m$^{-3}$, preferably between 1000 and 4000 Ns·m$^{-3}$, measured according to current ISO 9053, using the direct airflow method (method A).

The air permeable foil may be pre-perforated, for instance by needle perforation, and or made air permeable during the moulding of the inner dash for instance by the effect of hot steam and/or by needles integrated in the moulding process.

Preferably the frizzy fibers are hollow.

Surprisingly the use of a combination of frizzy fibers with a thermoplastic binder makes it possible to increase the thickness at a lower density, while maintaining or even improving the acoustic performance. This enables a better filling of the space available without the need to add additional weight to the part.

The frizzy fiber is a side by side conjugate fiber also referred to as bicomponent fiber. The frizzy fibers, also referred to as curved or self-crimped fibers, are made for instance by two sides, of the conjugate fiber, and are arranged such that one side shrinks differently from the other side and thereby induces a permanent curved shaping of the filament away from the straight line, for instance in the form of spiral, omega or helical. However in most cases the shape is not necessarily a regular structure but irregular 3-dimensionally shaped versions are having the same advantage.

Preferably the conjugate material is chosen such that there is a difference in viscosity causing an inherent curling or frizzing in the fibre. However other types of conjugate fibers that show a similar effect as defined might be chosen as well.

Surprisingly adding frizzy fibers to thermoplastic felt lining material enhances the evenness of the material layer obtained by for instance carding methods or more preferably air laying methods. The natural tendency of the frizzy fibers to go back to a random curled form gives the fibers an additional resilience. For instance, open fibers are not forming clumps again during processing and are therefore better spread throughout the layer.

Surprisingly the material as claimed can be thermoformed more precisely in a 3-D shape and in addition the resilience of the material is not substantially reduced during curing or moulding, showing that the frizzy fibers are less prone to deterioration during the curing or moulding process of the actual part. Furthermore the fibrous layer comprising frizzy fibers keeps its resilience during use, therefore the initial thickness obtained directly after moulding is maintained longer.

Frizzy fibers or self-crimped fibers differ from mechanically crimped fibers because they obtain the crimping capacity during the spinning of the fiber as an intrinsic feature of the fiber. This intrinsic self-crimp of frizzy fibers is less likely to be lost during further production process steps or later use of the material. The crimp in frizzy fibers is permanent.

The advantages of using a frizzy fiber rather than a mechanically crimped fiber are manifold. For the invention as disclosed the most important advantages are that the fiber is in the crimped status from the beginning of the production of the fibrous layers. The crimped status in the form of a randomly 3-dimensional shaped fiber is the preferred status of the fiber. Surprisingly, the fiber stays in this preferred shape during the whole production as well as during the lifetime of the trim part. Mechanically crimp on its own is less strong and will lose its properties over time. Mechanically crimped fibers will flatten out over time, losing the resilience and loftiness, making the trim part fails over time in its purpose.

Preferably the frizzy fibers are made of at least one material selected from the group consisting of polyamide (nylon) such as polyamide 6 or polyamide 66, polyester such as copolymers of polyester or polyethylene terephthalate (PET) or polybutylene terephthalate (PTB), Polytrimethylene terephthalate (PTT), polyolefin, polypropylene and polyethylene such as copolymer of polyethylene.

The two sides, components or polymers, should be distributed in the filament string such that a difference in shrinkage is given. The maximum shrink difference between the two sides may be developed when the fibers are comprised of equal parts of each component and the components were separated and located on opposite sides of the fiber in cross section.

The frizzy fibers may also be made of a combination of a polymer such as different polyester, for instance a combination of polyethylene terephthalate (PET) and Polytrimethylene terephthalate (PTT).

Preferably the frizzy fibres have an overall round cross section, more preferably with a hollow core, also known as hollow conjugate fibers. However, other cross-sections known in the art to make conjugate frizzy fibers can be used as well.

The staple fibre length of frizzy fibers used is preferably between 32 and 76 mm, preferably 32 to 64 mm. The fiber is preferably between 2 and 28 dtex, preferably between 3 and 15 dtex, preferably between 3 and 10 dtex.

The binder material should have a lower melting point compared to the polymers which the frizzy fibers are made of, hence only the binder is melting during the production and not the frizzy fibers.

Preferably the binder material is in the form of fibers, flakes or powder. More preferably the binder material is one of a mono-component fiber or bi-component fiber.

Preferably the binder material is made of at least one of the materials selected from the group consisting of polyester such as polyethylene terephthalate, copolymers of polyester, polyolefin, polypropylene, polyethylene, polylactic acid (PLA) and polyamide such as polyamide 6 or polyamide 66.

Surprisingly a preferred combination of cotton fibers and frizzy fibers, bound together using binder fibers shows an increase in compressional stiffness, improving the overall performance. Due to the higher compressional stiffness the inner dash will not reduce in its thickness during use.

The binder fibre length is preferably between 32 and 76 mm, preferably 32 to 64 mm. The binder fiber is preferably between 2 and 5 dtex.

Preferably the porous fibrous layer has an area weight between 200 and 2000 g·m$^{-2}$, preferably between 400 and 1200 g·m$^{-2}$, preferably between 500 and 1000 g·m$^{-2}$, Preferably the fibrous layer consists of 10 to 40% of binder, 10 to 70% of filler fibers and 10 to 70% of frizzy fibers and wherein the total amount adds to 100% by weight.

Preferably the fibrous layer consists of 10 to 40% of binder, 10 to 40% of filler fibers and 10 to 60% of frizzy fibers and 10 to 50% shredded foam pieces and wherein the total amount adds to 100% by weight.

Preferably the foam is polyurethane foam, preferably soft polyurethane foam. The density of the foam is preferably between 10 and 100 kg·m$^{-3}$, preferably between 20 and 90 kg·m$^{-3}$, preferably between 25 and 85 kg·m$^{-3}$. The size of the shredded foam pieces is preferably between 2 and 20 mm, preferably between 3 and 15 mm, preferably between 4 and 10 mm.

Preferably the filler fibers comprise reclaimed fibers made of at least one material selected from the group consisting of cotton shoddy, synthetic shoddy, polyester shoddy, natural fiber shoddy and mixed synthetic fiber and natural fiber shoddy.

Reclaimed fibers are preferably produced from textile fabrics, preferably shoddy cotton, shoddy synthetic, shoddy polyester or shoddy natural fibers. The shoddy type is defined by having at least 51% by weight of the material included, 49% can be fibers from other sources. So for instance, shoddy polyester contains at least 51% by weight of polyester based materials. Alternatively, the shoddy material can be a mixture of different synthetic and natural fibers, whereby not one type is prevailing.

However in other embodiments the fibers may further comprise mineral fibers, preferably one of glass fibers or recycled glass fibers or basalt fibers or carbon fibers or synthetic fibers selected from the group consisting of polyamide (nylon) such as polyamide 6 or polyamide 66, polyester such as copolymers of polyester or polyethylene terephthalate (PET) or polybutylene terephthalate (PTB) or Polytrimethylene terephthalate (PTT), polyolefin, polypropylene and polyethylene such as copolymer of polyethylene.

Any of the fibers, frizzy fibers, binder fibers, filler fibers, reclaimed fibers, synthetic fibers, natural fibers or mineral fibers are staple fibers and may be made of virgin and or recycled material.

The fibrous layer may have a variable density and or variable area weight over the part.

The porous fibrous layer may have essentially constant area weight, with locally a variable density and thickness. This can be achieved preferably by compressing the thermoplastic fibrous layer during the moulding of the trim part to form the required shape, resulting in a product that is overall air permeable and functions as an acoustic absorbing lining that is light weight and keeps its structure during the lifetime of the product.

Alternatively the porous fibrous layer can have an essentially constant density and a variable area weight, for example the density of the porous fibrous layer is essentially constant at variable thickness.

Fibrous layers with essentially constant density has preferable a density between 45 and 75 kg/m$^3$, preferably between 40 and 60 kg/m$^3$.

For instance when the fibrous mat is made on an injection fiber machine like for instance disclosed in EP 2640881 Awhere the fiber mixture including the binder is fed in a cavity in the form of the final product, the fiber density is kept constant throughout the filling process giving rise to a porous fibrous layer shape that contains the thickness variations necessary with a variable area weight and an essentially constant density. This fibrous layer can either be consolidated directly on the machine as disclosed in the patent referenced or can be consolidated directly afterwards by feeding the form to a moulding device and consolidating the felt inside the mould.

The foil can be introduced in the moulding step and directly laminated with the fibrous layer or after the moulding of the fibrous layer laminated to the already consolidated part, as known by the skilled person.

The fibrous layer comprising the frizzy fibers and a thermoplastic binder can be a carded or air laid layer and moulded together with the foil to form a trim part.

Alternatively a carded or air laid fibrous layer can be optionally pre-consolidated and moulded together with the foil to form a trim part.

Preferably the trim part is thermally moulded to form a 3-dimensional shaped part.

The thickness of the trim part is mostly depending on space restrictions in the vehicle. Preferably the thickness can be varied over the area of the part to follow the available space in the vehicle. Typical overall average thickness of inner dashes is normally between 15 and 25 mm.

Preferable the porous fibrous layer has a thickness between 4 and 30 mm, preferably between 5 and 20 mm.

The foil comprises at least one foil layer comprising at least one of the polymers or copolymers selected from the group consisting of Polyester such as polyethylene terephthalate (PET) or polybutylene terephthalate (PTB) or copolyester (CoPES), polyamide such as polyamide 6 or polyamide 66, polyolefin such as a polyethylene (PE) or low density polyethylene (LDPE) or linear low density polyethylene (LLDPE) or high density polyethylene (HDPE), polypropylene (PP), thermoplastic elastomers (TPEs) such as thermoplastic polyolefin (TPO), thermoplastic polyurethane (TPU), polyetherimide, polysulfone, polyethersulfone, polyetheretherketone and copolymers such as ethylene vinyl acetate (EVA) or biopolymers such as polylactic acid.

Preferably a bilayer or multilayer foil may be used wherein the layer adjacent to the fibrous layer may function as a binding layer laminating the foil and fibrous layer.

Preferably the foil layer has a thickness between 40 and 200 micrometres, preferably between 60 and 100 micrometres.

For any of the fibers or the foil the polymers used can be virgin or based on recycled material, as long as the material requirements are fulfilled.

The foil can also be referred to as a film.

The trim part may further include blocks of for example expanded polypropylene (EPP) or expanded polystyrene (EPS) inserts. However these blocks should not be seen as part of the two layer inner dash trim part according to the invention since they are used for other functions, such as crash pads, and does not necessarily contribute to the noise attenuation according to the invention and might locally decrease the noise absorption.

The inner dash trim part may further comprise an air permeable decorative layer adjacent to the foil.

Preferably the decorative layer has a very low AFR value, preferably below 200 $Ns \cdot m^{-3}$, in order to not influence the noise attenuation of the trim part. The AFR measured according to current ISO 9053, using the direct airflow method (method A)

The inner dash trim part may be produced in different ways known in the art however preferably the method for producing the inner dash trim part comprises the steps of
 a. preparing an unconsolidated fibrous layer
 b. stacking the foil and the unconsolidated fibrous layer in a mould
 c. consolidating the material in said cavity by a consolidating treatment, preferably hot air, steam or infrared heating, whereby the fibers at least partly adhere to neighbouring fibers with help of the binder used.
 d. optionally cooling and releasing the padding layer from the product shaping area.

The moulding is done at a temperature such that the binder softens and or melts and form droplets binding together the other fibers.

Alternatively the layers may be heated and the moulding is done in a cold tool.

Thus, it is one aspect of the present invention to provide a moulded inner dash trim part for a vehicle, consisting of: a porous fibrous layer comprising fibers and a thermoplastic binder laminated to an air permeable foil; wherein the fibers comprise conjugate frizzy fibers made of at least two sides with a difference between the two sides inducing an intrinsic permanent frizzy or curved shape in a random three-dimensional form; and wherein the air permeable foil has an airflow resistance between 30-75% of the total airflow resistance of the trim part.

Further aspects of the present invention are provided in the following embodiments:

A moulded inner dash trim part for a vehicle, consisting of: a porous fibrous layer comprising fibers and a thermoplastic binder laminated to an air permeable foil; wherein the fibers comprise conjugate frizzy fibers made of at least two sides with a difference between the two sides inducing an intrinsic permanent frizzy or curved shape in a random three-dimensional form; wherein the air permeable foil has an airflow resistance between 30-75% of the total airflow resistance of the trim part; and wherein the frizzy fibers are hollow.

A moulded inner dash trim part for a vehicle, consisting of: a porous fibrous layer comprising fibers and a thermoplastic binder laminated to an air permeable foil; wherein the fibers comprise conjugate frizzy fibers made of at least two sides with a difference between the two sides inducing an intrinsic permanent frizzy or curved shape in a random three-dimensional form; wherein the air permeable foil has an airflow resistance between 30-75% of the total airflow resistance of the trim part; and wherein the total airflow resistance of the trim part is between 500 and 6000 Ns·m-3.

A moulded inner dash trim part for a vehicle, consisting of: a porous fibrous layer comprising fibers and a thermoplastic binder laminated to an air permeable foil; wherein the fibers comprise conjugate frizzy fibers made of at least two sides with a difference between the two sides inducing an intrinsic permanent frizzy or curved shape in a random three-dimensional form; wherein the air permeable foil has an airflow resistance between 30-75% of the total airflow resistance of the trim part; and wherein the frizzy fibers are made of at least one material selected from the group consisting of polyamide, polyester, and polyolefin.

A moulded inner dash trim part for a vehicle, consisting of: a porous fibrous layer comprising fibers and a thermoplastic binder laminated to an air permeable foil; wherein the fibers comprise conjugate frizzy fibers made of at least two sides with a difference between the two sides inducing an intrinsic permanent frizzy or curved shape in a random three-dimensional form; wherein the air permeable foil has an airflow resistance between 30-75% of the total airflow resistance of the trim part; and wherein the binder is made of at least one of the materials selected from the group consisting of polyester, polyolefin, polylactic acid (PLA), and polyamide.

A moulded inner dash trim part for a vehicle, consisting of: a porous fibrous layer comprising fibers and a thermoplastic binder laminated to an air permeable foil; wherein the fibers comprise conjugate frizzy fibers made of at least two sides with a difference between the two sides inducing an intrinsic permanent frizzy or curved shape in a random three-dimensional form; wherein the air permeable foil has an airflow resistance between 30-75% of the total airflow resistance of the trim part; and wherein the porous fibrous layer has an area weight between 200 and 2000 g·m-2.

A moulded inner dash trim part for a vehicle, consisting of: a porous fibrous layer comprising fibers and a thermoplastic binder laminated to an air permeable foil; wherein the fibers comprise conjugate frizzy fibers made of at least two sides with a difference between the two sides inducing an intrinsic permanent frizzy or curved shape in a random three-dimensional form; wherein the air permeable foil has an airflow resistance between 30-75% of the total airflow resistance of the trim part; and wherein the density of the porous fibrous layer is essentially constant at variable thickness.

A moulded inner dash trim part for a vehicle, consisting of: a porous fibrous layer comprising fibers and a thermoplastic binder laminated to an air permeable foil; wherein the fibers comprise conjugate frizzy fibers made of at least two sides with a difference between the two sides inducing an intrinsic permanent frizzy or curved shape in a random three-dimensional form; wherein the air permeable foil has an airflow resistance between 30-75% of the total airflow resistance of the trim part; and wherein the porous fibrous layer consists of 10 to 40% of binder, 10 to 70% of filler fibers, and 10 to 70% of frizzy fibers, and wherein the total amount adds to 100% by weight.

A moulded inner dash trim part for a vehicle, consisting of: a porous fibrous layer comprising fibers and a thermoplastic binder laminated to an air permeable foil; wherein the fibers comprise conjugate frizzy fibers made of at least two sides with a difference between the two sides inducing an intrinsic permanent frizzy or curved shape in a random three-dimensional form; wherein the air permeable foil has an airflow resistance between 30-75% of the total airflow resistance of the trim part; and wherein the porous fibrous layer consists of 10 to 40% of binder, 10 to 40% of filler fibers and 10 to 60% of frizzy fibers, and 10 to 50% shredded foam pieces, and wherein the total amount adds to 100% by weight.

A moulded inner dash trim part for a vehicle, consisting of: a porous fibrous layer comprising fibers and a thermoplastic binder laminated to an air permeable foil; wherein the fibers comprise conjugate frizzy fibers made of at least two sides with a difference between the two sides inducing an intrinsic permanent frizzy or curved shape in a random three-dimensional form; wherein the air permeable foil has an airflow resistance between 30-75% of the total airflow resistance of the trim part; and wherein the fibers further comprise mineral fibers, glass fibers, recycled glass fibers, basalt fibers, carbon fibers, or synthetic fibers selected from the group consisting of polyamide, polyester, and polyolefin.

A moulded inner dash trim part for a vehicle, consisting of: a porous fibrous layer comprising fibers and a thermoplastic binder laminated to an air permeable foil; wherein the fibers comprise conjugate frizzy fibers made of at least two sides with a difference between the two sides inducing an intrinsic permanent frizzy or curved shape in a random three-dimensional form; wherein the air permeable foil has an airflow resistance between 30-75% of the total airflow resistance of the trim part; and wherein the filler fibers comprise reclaimed fibers made of at least one material selected from the group consisting of cotton shoddy, synthetic shoddy, polyester shoddy, natural fiber shoddy and mixed synthetic fiber, and natural fiber shoddy.

A moulded inner dash trim part for a vehicle, consisting of: a porous fibrous layer comprising fibers and a thermoplastic binder laminated to an air permeable foil; wherein the fibers comprise conjugate frizzy fibers made of at least two sides with a difference between the two sides inducing an intrinsic permanent frizzy or curved shape in a random three-dimensional form; wherein the air permeable foil has an airflow resistance between 30-75% of the total airflow resistance of the trim part; and wherein the foil comprises at least one foil layer comprising at least one of the polymers or copolymers selected from the group consisting of polyester, polyamide, polyolefin, ethylene acrylic acid copolymers (EAA), thermoplastic elastomers, ethylene vinyl acetate, and polylactic acid (PLA).

A moulded inner dash trim part for a vehicle, consisting of: a porous fibrous layer comprising fibers and a thermoplastic binder laminated to an air permeable foil; wherein the fibers comprise conjugate frizzy fibers made of at least two sides with a difference between the two sides inducing an intrinsic permanent frizzy or curved shape in a random three-dimensional form; wherein the air permeable foil has an airflow resistance between 30-75% of the total airflow resistance of the trim part; and wherein the frizzy fibers are made of at least one material selected from the group consisting of polyamide, polyester, and polyolefin, wherein: the polyamide is polyamide 6 or polyamide 66; the polyester is comprised of copolymers thereof, polyethylene terephthalate (PET), polybutylene terephthalate (PTB), or polytrimethylene terephthalate (PTT); and wherein the polyolefin is a polyethylene or polypropylene.

A moulded inner dash trim part for a vehicle, consisting of: a porous fibrous layer comprising fibers and a thermoplastic binder laminated to an air permeable foil; wherein the fibers comprise conjugate frizzy fibers made of at least two sides with a difference between the two sides inducing an intrinsic permanent frizzy or curved shape in a random three-dimensional form; wherein the air permeable foil has an airflow resistance between 30-75% of the total airflow resistance of the trim part; and wherein the binder is made of at least one of the materials selected from the group consisting of polyester, polyolefin, polylactic acid (PLA), and polyamide; and wherein: the polyester is polyethylene terephthalate or copolymers of polyester; the polyolefin, is polypropylene or polyethylene; and wherein the polyamide is polyamide 6 or polyamide 66.

A moulded inner dash trim part for a vehicle, consisting of: a porous fibrous layer comprising fibers and a thermoplastic binder laminated to an air permeable foil; wherein the fibers comprise conjugate frizzy fibers made of at least two sides with a difference between the two sides inducing an intrinsic permanent frizzy or curved shape in a random three-dimensional form; wherein the air permeable foil has an airflow resistance between 30-75% of the total airflow resistance of the trim part; wherein the fibers further comprise mineral fibers, glass fibers, recycled glass fibers, basalt fibers, carbon fibers, or synthetic fibers selected from the group consisting of polyamide, polyester, and polyolefin; and wherein: the polyamide is polyamide 6 or polyamide 66; the polyester is comprised of copolymers of polyester, polyethylene terephthalate (PET), polybutylene terephthalate (PTB), or polytrimethylene terephthalate (PTT); and wherein the polyolefin is a polyethylene, a polypropylene, or a copolymer of polyethylene.

A moulded inner dash trim part for a vehicle, consisting of: a porous fibrous layer comprising fibers and a thermoplastic binder laminated to an air permeable foil; wherein the fibers comprise conjugate frizzy fibers made of at least two sides with a difference between the two sides inducing an intrinsic permanent frizzy or curved shape in a random three-dimensional form; wherein the air permeable foil has an airflow resistance between 30-75% of the total airflow resistance of the trim part; wherein the foil comprises at least one foil layer comprising at least one of the polymers or copolymers selected from the group consisting of polyester, polyamide, polyolefin, ethylene acrylic acid copolymers (EAA), thermoplastic elastomers, ethylene vinyl acetate, and polylactic acid (PLA); and wherein: the polyester is polyethylene terephthalate (PET), polybutylene terephthalate (PTB), or copolyester (CoPES); the polyamide is polyamide 6 or polyamide 66; the polyolefin is a polyethylene (PE), low density polyethylene (LDPE), linear low density polyethylene (LLDPE), or high density polyethylene (HDPE); and the thermoplastic elastomers (TPEs) is thermoplastic polyolefin (TPO), thermoplastic polyurethane (TPU), polyetherimide, polysulfone, or polyethersulfone, polyetheretherketone.

Any range given should include the starting and end points as well as normal expected deviations in the measurements. Start and end point values of different ranges may be combined.

Further embodiments of the invention may be derived from the description also by combining the different embodiments and examples of the invention and may be also derived from the description of the embodiments shown in the figures. The figures are schematic pictures and are not necessarily in scale.

BRIEF DESCRIPTION OF DRAWINGS

FIG. 1 shows cross sections of conjugate side by side fibers (1) according to the invention. The fibers are produced from two thermoplastic polymers with a difference in the polymers such that the fiber will curl during the fiber production process forming frizzy fibers. The side (2) by side (3) can be symmetrical organised as shown in figure A or can be asymmetrical as shown in figure B. In addition the fibers may be hollow (4) as shown for the side by side fiber cross section of figure C as an example.

FIG. 2 is a schematic cross-sectional view of a vehicle (5) with the inner dash trim part with the porous fibrous layer (6) facing the car body and the air permeable foil (7) facing the passenger department.

Figure 1:
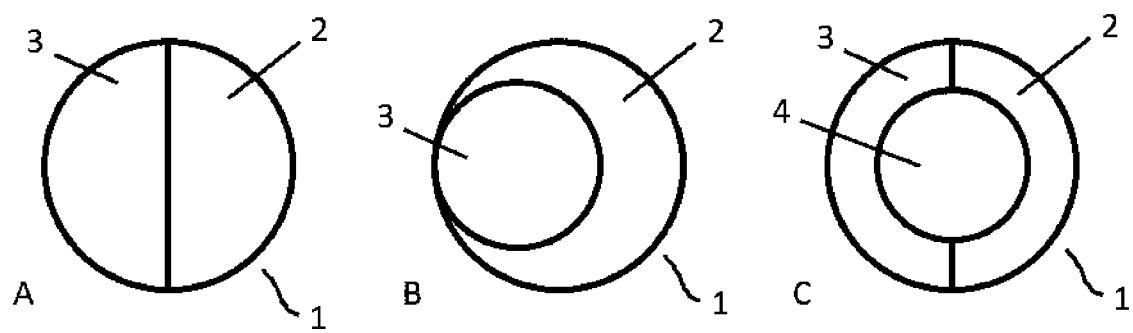
FIG. 1 shows schematic examples of cross sections of conjugate fibers according to the invention.
Figure 2:
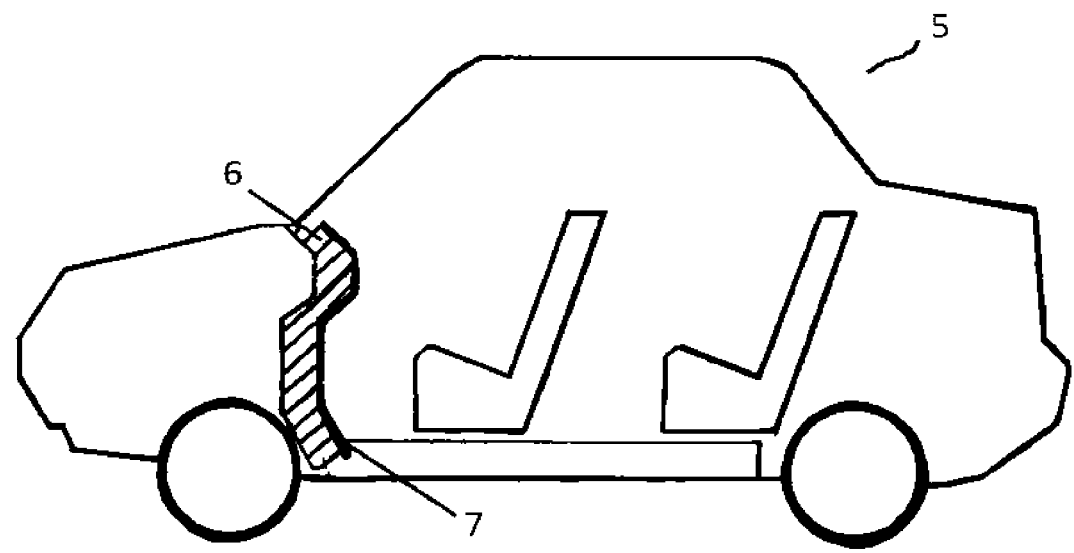
FIG. 2 is a schematic cross-sectional view of a vehicle and the inner dash trim part according to the invention.

The invention claimed is:

1. A moulded inner dash trim part for a vehicle, consisting of:
a porous fibrous layer comprising fibers and a thermoplastic binder laminated to an air permeable foil;
wherein the fibers comprise conjugate frizzy fibers made of at least two sides with a difference between the two sides inducing an intrinsic permanent frizzy or curved shape in a random three-dimensional form; and
wherein the air permeable foil has an airflow resistance between 30-75% of the total airflow resistance of the trim part.

2. The moulded inner dash trim part according to claim 1, wherein the frizzy fibers are hollow.

3. The moulded inner dash trim part according to claim 1, wherein the total airflow resistance of the trim part is between 500 and 6000 Ns·m$^{-3}$.

4. The moulded inner dash trim part according to claim 1, wherein the frizzy fibers are made of at least one material selected from the group consisting of polyamide, polyester, and polyolefin.

5. The moulded inner dash trim part according to claim 1, wherein the binder is made of at least one of the materials selected from the group consisting of polyester-, polyolefin, polylactic acid (PLA), and polyamide.

6. The moulded inner dash trim part according to claim 1, wherein the porous fibrous layer has an area weight between 200 and 2000 g·m$^{-2}$.

7. The moulded inner dash trim part according to claim 1, wherein the density of the porous fibrous layer is essentially constant at variable thickness.

8. The moulded inner dash trim part according to claim 1, wherein the porous fibrous layer consists of 10 to 40% of binder, 10 to 70% of filler fibers, and 10 to 70% of frizzy fibers, and wherein the total amount adds to 100% by weight.

9. The moulded inner dash trim part according to claim 1, wherein the porous fibrous layer consists of 10 to 40% of binder, 10 to 40% of filler fibers and 10 to 60% of frizzy fibers, and 10 to 50% shredded foam pieces, and wherein the total amount adds to 100% by weight.

10. The moulded inner dash trim part according to claim 1, wherein the fibers further comprise mineral fibers, glass fibers, recycled glass fibers, basalt fibers, carbon fibers, or synthetic fibers selected from the group consisting of polyamide, polyester, and polyolefin.

11. The moulded inner dash trim part according to claim 8, wherein the filler fibers comprise reclaimed fibers made of at least one material selected from the group consisting of cotton shoddy, synthetic shoddy, polyester shoddy, natural fiber shoddy and mixed synthetic fiber, and natural fiber shoddy.

12. The moulded inner dash trim part according to claim 1, wherein the foil comprises at least one foil layer comprising at least one of the polymers or copolymers selected from the group consisting of polyester, polyamide, polyolefin, ethylene acrylic acid copolymers (EAA), thermoplastic elastomers, ethylene vinyl acetate, and polylactic acid (PLA).

13. The moulded inner dash trim part according to claim 4, wherein:
the polyamide is polyamide 6 or polyamide 66;
the polyester is comprised of copolymers thereof, polyethylene terephthalate (PET), polybutylene terephthalate (PTB), or polytrimethylene terephthalate (PTT); and
wherein the polyolefin is a polyethylene for polypropylene.

14. The moulded inner dash trim part according to claim 5, wherein:
the polyester is polyethylene terephthalate or copolymers of polyester;
the polyolefin, is polypropylene or polyethylene; and
wherein the polyamide is polyamide 6 or polyamide 66.

15. The moulded inner dash trim part according to claim 10, wherein:

the polyamide is polyamide 6 or polyamide 66;
the polyester is comprised of copolymers of polyester, polyethylene terephthalate (PET), polybutylene terephthalate (PTB), or polytrimethylene terephthalate (PTT); and
wherein the polyolefin is a polyethylene, a polypropylene, or a copolymer of polyethylene.

16. The moulded inner dash trim part according to claim 12, wherein:
the polyester is polyethylene terephthalate (PET), polybutylene terephthalate (PTB), or copolyester (CoPES);
the polyamide is polyamide 6 or polyamide 66;
the polyolefin is a polyethylene (PE), low density polyethylene (LDPE), linear low density polyethylene (LLDPE), or high density polyethylene (HDPE); and
the thermoplastic elastomers (TPEs) is thermoplastic polyolefin (TPO), thermoplastic polyurethane (TPU), polyetherimide, polysulfone, or polyethersulfone, polyetheretherketone.

* * * * *